US008332263B2

(12) United States Patent
Ramesh et al.

(10) Patent No.: US 8,332,263 B2
(45) Date of Patent: Dec. 11, 2012

(54) SYSTEM AND METHOD FOR CONFIGURING SCORING RULES AND GENERATING SUPPLIER PERFORMANCE RATINGS

(75) Inventors: Sunder M Ramesh, San Jose, CA (US); Thomas R Rumberg, Dublin, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1908 days.

(21) Appl. No.: 10/327,291

(22) Filed: Dec. 19, 2002

(65) Prior Publication Data

US 2007/0179791 A1  Aug. 2, 2007

(51) Int. Cl.
*G06Q 10/00* (2012.01)
(52) U.S. Cl. ........................................... 705/7.39
(58) Field of Classification Search ............... 705/10, 705/11
See application file for complete search history.

(56) References Cited

U.S. PATENT DOCUMENTS

| | | | | |
|---|---|---|---|---|
| 4,715,011 A * | 12/1987 | Brittan | ............ | 708/445 |
| 5,369,570 A * | 11/1994 | Parad | ............ | 705/8 |
| 5,550,746 A * | 8/1996 | Jacobs | ............ | 700/231 |
| 5,765,138 A * | 6/1998 | Aycock et al. | ............ | 705/7 |
| 5,819,232 A * | 10/1998 | Shipman | ............ | 705/8 |
| 5,844,817 A * | 12/1998 | Lobley et al. | ............ | 703/2 |
| 6,161,101 A * | 12/2000 | Guinta et al. | ............ | 706/45 |
| 6,249,785 B1 * | 6/2001 | Paepke | ............ | 707/5 |
| 6,308,161 B1 * | 10/2001 | Boden et al. | ............ | 705/7 |
| 6,327,571 B1 * | 12/2001 | Khayat et al. | ............ | 705/10 |
| 6,393,406 B1 * | 5/2002 | Eder | ............ | 705/7 |
| 6,487,541 B1 * | 11/2002 | Aggarwal et al. | ............ | 705/26 |
| 6,556,974 B1 * | 4/2003 | D'Alessandro | ............ | 705/10 |
| 6,631,305 B2 * | 10/2003 | Newmark | ............ | 700/110 |
| 6,631,365 B1 * | 10/2003 | Neal et al. | ............ | 707/2 |
| 6,708,155 B1 * | 3/2004 | Honarvar et al. | ............ | 705/7 |
| 6,895,385 B1 * | 5/2005 | Zacharia et al. | ............ | 705/10 |
| 7,184,934 B2 * | 2/2007 | Russell et al. | ............ | 702/186 |
| 7,356,484 B2 * | 4/2008 | Benjamin et al. | ............ | 705/11 |
| 2004/0267502 A1 * | 12/2004 | Aliphas | ............ | 702/186 |

OTHER PUBLICATIONS

Prasad, Biren; "JIT Quality Matrices for strategic planning and implementation", 1995, International Journal of Operations & Production Management, v15n9, pp. 116-142.*

Guttman, Robert H., "Merchant Differentiation through Integrative Negotiation in Agent-minded Electronic Commerce", MS Thesis, MIT Department of Media Arts and Sciences, May 7, 1999, pp. 1-153.*

(Continued)

*Primary Examiner* — Jonathan G Sterrett
(74) *Attorney, Agent, or Firm* — Kilpatrick Townsend & Stockton LLP (57) ABSTRACT

A system and method for configuring a scoring rule is described. One embodiment includes constructing a performance level code for each performance metric in the scoring rule, designating performance levels and corresponding raw score ranges for each performance level code, assigning a performance metric point maximum to each performance metric and assigning a performance level weighting to each performance level. These relationships, which define the scoring rule, are set forth in a performance level code repository and a scoring rule repository. A system and method for computing a supplier performance rating also are described. In one embodiment, a raw score generator generates a raw score for each performance metric in the scoring rule, a performance level generator converts the raw scores into performance levels, a scaled score generator converts the performance levels into scaled scores and a performance rating generator sums the scaled scores to produce the performance rating.

12 Claims, 6 Drawing Sheets

OTHER PUBLICATIONS

Mohanty, R P; Deshmukh, S G; Use of analytic hierarchic process for evaluating sources of supply, 1993, International Journal of Physical Distribution & Logistics Management, v23n3, pp. 22-28, Dialog 00771452 94-20844.*

Youssef, Mohamed A; Mohammed Zairi; Bidhu, Mohanty; "Supplier selection in an advanced manufacturing technology environment: an optimization model", 1996, Benchmarking for Quality Management & Technology, v3n4, pp. 60, Dialog 02243566 84986974.*

Teas, R Kenneth; "Expectations, performance evaluation, and consumer's perceptions of quality", Oct. 1993, Journal of Marketing, v57n4, pp. 18-34, Dialog 00774399 94-23791.*

Prasad, Biren; "Synthesis of market research data through a combined effort of QFD, value engineering and value graph techniques", 1998, Qualitative Market Research, v1n3, pp. 156-172, Dialog 02329178 86924658.*

Vendor rating for an entrepreneur development programme: a case study using the analytic hierarchy . . . S Yahya, B Kingsman—Journal of the Operational Research Society, 1999—jstor.org.*

Outranking methods in support of supplier selection L De Boer, L van der Wegen, J Telgen—European Journal of Purchasing and Supply Management, 1998—mb.utwente.nl.*

Supplier selection and management system considering relationships in supply chain management EK Lee, S Ha, SK Kim—IEEE Transactions on Engineering management, 2001—syslab.korea.ac.kr.*

Stephens, Scott; "Supply Chain Council & Supply Chain Operations Reference (SCOR) Model Overview", May 1999, pp. 1-31.*

Lawlis, et al.; "A Formal Process for evaluating COTS Software Products", (C) 2001 IEEE, Computer, pp. 58-63.*

"Internal marketing and supply chain management" [PDF] from qut.edu.au IN Lings—Journal of Services Marketing, 2000—emeraldinsight.com.*

A decision support system for supplier selection using an integrated analytic hierarchy process and linear programming SH Ghodsypour . . . —International Journal of Production Economics, 1998—Elsevier.*

Wikipedia, "Analytic Hierarchy Process", retrieved from the web Sep. 15, 2011.*

* cited by examiner

| Performance Level Codes 112 | Descriptions 312 | Types 314 | Performance Level 1 114 | Performance Level 2 114 | Performance Level 3 114 | Performance Level 4 114 |
|---|---|---|---|---|---|---|
| PERC | Percentages, Range: 0% to 100% | Percentage | 25% 316 | 50% 318 | 75% 320 | 100% 322 |
| DAYS | Days Outstanding | Absolute Value | 50 324 | 100 326 | 500 328 | N/A |
| AMT | Amount | Absolute Value | $1m 330 | $2m 332 | $3m 334 | $4m 336 |

Performance Level Code Repository 132

FIG. 3

| Performance Metrics 110 | Performance Metric Point Maximums 116 | Performance Level Codes 112 | Performance Level 1 114 | Performance Level 2 114 | Performance Level 3 114 | Performance Level 4 114 |
|---|---|---|---|---|---|---|
| Average Fills by Requisitions Sourced | 50 410 | PERC | 0% | 10% | 60% | 100% |
| Average Rejects by Submittals | -20 | PERC | 10% | 20% | 70% | 100% |
| Average Purchase Order Amounts | 25 414 | AMT | 100% 418 | 80% 420 | 60% 422 | 40% 424 |
| Average Response Time | 50 416 | DAYS | 100% 426 | 60% 428 | 0% 430 | N/A |

Scoring Rule Repository 134

SYSTEM AND METHOD FOR CONFIGURING SCORING RULES AND GENERATING SUPPLIER PERFORMANCE RATINGS

BACKGROUND OF THE INVENTION

1. Field of the Invention

This invention relates generally to supplier sourcing and more specifically to a system and method for configuring scoring rules and generating supplier performance ratings.

2. Description of the Background Art

A fundamental tenet of economics, both theoretically and practically, is that consumers of goods and services typically purchase those goods and services from suppliers. Many consumers, especially companies and governments, use multiple suppliers to supply the same goods and services. These consumers use multiple suppliers for many reasons, including (i) to avoid becoming too dependent on any one supplier, (ii) to address the fact that one supplier or a small number of suppliers may not be able to produce the desired amounts of goods or services or deliver those goods or services within the requisite time frame, (iii) to obtain competitive pricing, and (iv) to have the flexibility to use suppliers capable of fulfilling specialized orders or transactions.

Although beneficial for these reasons and others, using multiple suppliers also creates several problems for consumers. One of the more pressing problems is determining which supplier is best suited for a given order or transaction. To address this problem, a consumer often employs some sort of supplier rating system to rate its various suppliers, awarding the order or transaction to the supplier or suppliers with the highest rating(s).

Generally, conventional supplier rating systems frequently implement scoring rules that use information from past transactions involving the different suppliers being rated to generate a performance rating for each supplier. A typical scoring rule is a function of several supplier oriented performance metrics, examples of which include price, delivery time, supplier credit worthiness and aggregate business conducted with the consumer. For each supplier, the supplier rating system (i) scores the supplier with respect to each performance metric defined in the scoring rule, (ii) converts each of these performance metric scores into a unitless converted score as defined in the scoring rule so that performance metric scores of disparate units and ranges can be compared and/or combined, and (iii) combines the converted scores in a manner set forth in the scoring rule to generate an overall performance rating for that supplier. A consumer then compares the performance ratings of the various suppliers and selects the supplier with the highest rating.

More specifically, a conventional supplier rating system begins with a scoring rule that rates each supplier with respect to a set number of performance metrics. The consumer normally has the ability to assign a weight to each performance metric that indicates the relative importance of that performance metric to the consumer. Each weight usually reflects the percentage of the maximum possible performance rating for which the corresponding performance metric would account. The sum of all of the weights therefore typically equals 100%.

The scoring rule also defines how to convert the individual performance metric scores into unitless converted scores. The scoring rule often employs a conversion scheme that maps a range of unitless converted scores onto the range of possible performance metric scores. Where a given performance metric score falls within the range of unitless converted scores determines the converted score attributed to that performance metric score. For example, assume that price is the performance metric at issue and that $0 to $5 million is the range of possible prices. If the scoring rule defines 1 through 5 as the range of unitless converted scores, then the scoring rule may dictate that a supplier's price of $1 million warrants a converted score of 5, a supplier's price of $2 million warrants a converted score of 4, a supplier's price of $3 million warrants a converted score of 3, and so on.

In most cases, the scoring rule applies the same conversion scheme to each performance metric, meaning that the scoring rule maps the same range of unitless converted scores onto the range of possible performance metric scores for each performance metric defined in the scoring rule. Continuing with the previous example, assume that delivery time is the performance metric at issue and that 2 to 10 days is the range of possible delivery times. The scoring rule again would use 1 through 5 as the range of unitless converted scores and may dictate that a supplier's delivery time of 2 days warrants a converted score of 5, a supplier's delivery time of 4 days warrants a converted score of 4, and so on.

As described above, for each supplier being rated, the supplier rating system generates a score for each performance metric in the scoring rule and converts each such performance metric score into a converted score as defined in the scoring rule. The supplier rating system then computes a scaled converted score for each performance metric. The scoring rule normally defines the scaled converted score as the converted score for a given performance metric multiplied by the weight the consumer assigned to that performance metric. Lastly, the supplier rating system sums the scaled converted scores to generate a performance rating for the supplier. The consumer then compares the performance ratings of the different suppliers and selects the supplier with the highest score as the "best" supplier for the project or transaction at hand.

A significant drawback to using conventional supplier rating systems is that the performance metrics used to construct the scoring rules are predetermined or fixed, meaning that the developer of the system determines the performance metrics, not the consumer. The consumer usually is not allowed to customize or otherwise modify any of the performance metrics in the scoring rule. For example, the consumer typically is unable to add any performance metrics to the scoring rule, regardless of their importance to the consumer. Likewise, the consumer typically is unable to delete any of the performance metrics from the scoring rule, even if they are of little value to the consumer. Consequently, the scoring rule in a typical supplier rating system oftentimes does not include many of the performance metrics relevant to consumers, thereby leading to performance ratings that are not necessarily a reliable measure of supplier performance.

Another related drawback is that the number of performance metrics used in conventional supplier rating systems is small. More often than not, a small set of performance metrics fails to cover adequately the range of factors that consumers value. Again, the result is an overly simplistic scoring rule that does not necessarily measure supplier performance reliably.

Yet another drawback to using conventional supplier rating systems is that changing the weights assigned to the various performance metrics in the scoring rule is cumbersome. As set forth above, the sum of the assigned weights typically is 100%. As a consequence, when a consumer alters one weight in the scoring rule, the consumer also must alter at least one other weight to maintain a sum of weights equal to 100%. Further, the consumer frequently must alter several weights to maintain the desired relative distribution of weights among the performance metrics. The result is that running different iterations of a scoring rule by varying the weights often proves unwieldy to consumers.

As the foregoing illustrates, a need exists for a supplier rating system that has greater configurability and weighting versatility than conventional supplier rating systems.

SUMMARY OF THE INVENTION

Among other things, this disclosure sets forth a supplier rating system that has greater configurability and weighting versatility than conventional supplier rating systems.

Included in the disclosure is one embodiment of a method for configuring a scoring rule. The embodiment entails constructing a performance level code for each performance metric of a set of performance metrics as well as designating one or more performance levels for each of the performance level codes. Designating the performance levels may include defining a raw score range for each of the performance levels. Assigning a performance metric point maximum to each of the performance metrics and assigning a performance level weighting to each of the performance levels also are part of the embodiment. Another embodiment of the method includes designating each performance metric in the set of performance metrics.

Also included in the disclosure is one embodiment of a system for generating a performance rating for a supplier. The embodiment has a performance level generator configured to receive a raw score for a performance metric and to match that raw score to a raw score range in order to identify a performance level. The embodiment also has a scaled score generator configured to receive the performance level, to identify a performance level weighting corresponding to the performance level, to identify a performance metric point maximum corresponding to the performance metric and to multiply the performance level weighting and the performance metric point maximum to produce a scaled score. In addition, the embodiment has a performance rating generator configured to receive the scaled score and to sum the scaled score with scaled scores generated for at least one other performance metric to produce the performance rating. Another embodiment of the system includes a raw score generator configured to receive supplier data related to the performance metric and to generate the raw score for the performance metric.

In yet another embodiment of the system, a performance level code repository contains a set of raw score ranges that correspond to a set of performance levels. The performance level generator uses the relationships between the set of raw score ranges and the set of performance levels to identify the performance level. In this same embodiment, a scoring rule repository contains the performance point maximum that corresponds to the performance metric and also contains the performance level weighting corresponding to the identified performance level. The scaled score generator uses the scoring rule repository information to generate the scaled score.

DETAILED DESCRIPTION OF THE INVENTION

Figure 1:
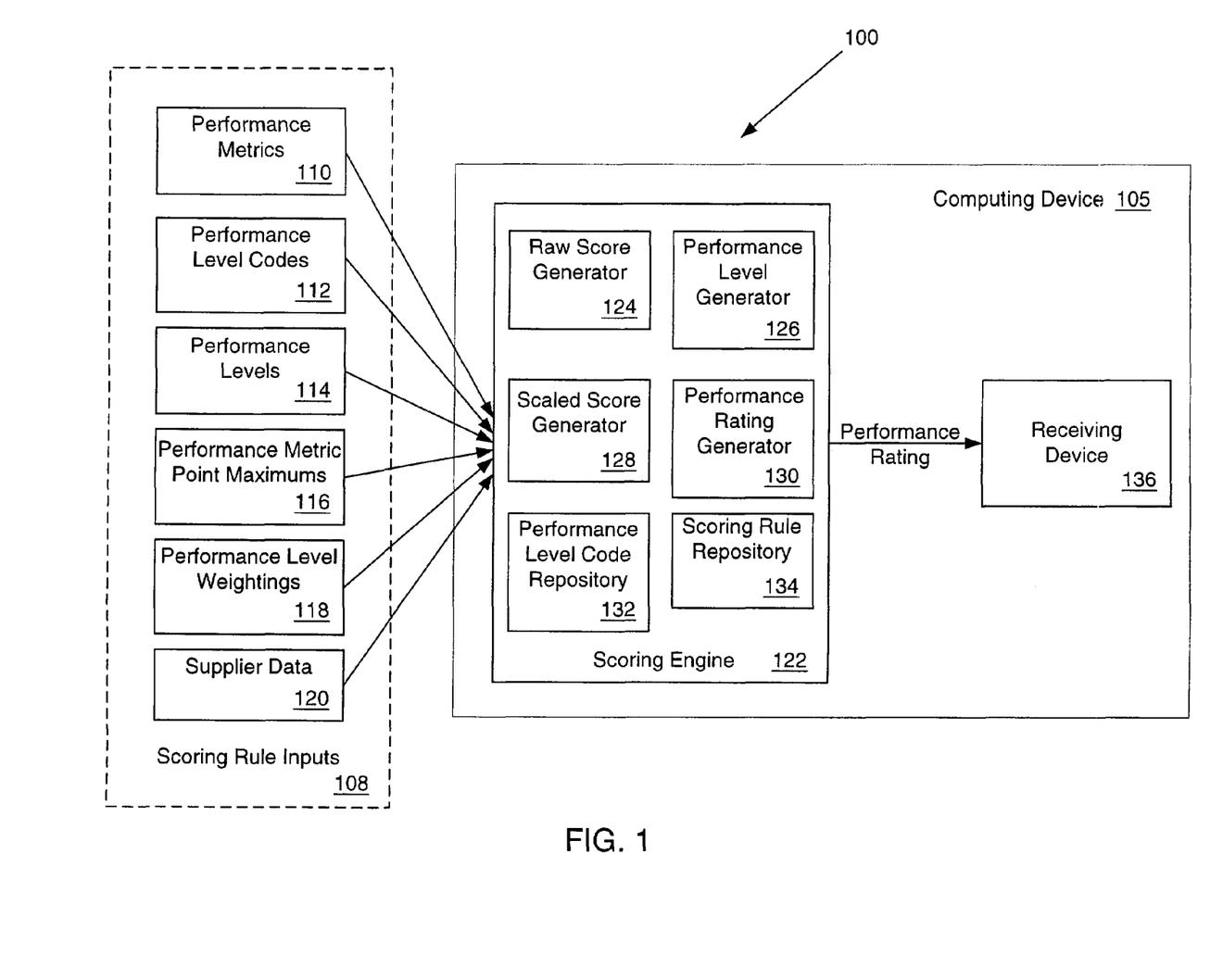
FIG. 1 is a block diagram illustrating one embodiment of a performance rating system, according to the invention.

FIG. 1 is a block diagram illustrating one embodiment of a performance rating system 100, according to the invention. A consumer may use performance rating system 100 to create scoring rules and to rate different suppliers to determine the supplier best suited for a given project or transaction. Performance rating system 100 implements a scoring rule that uses information from past transactions involving the suppliers being rated to compute a performance rating for each supplier. The consumer then compares the performance ratings of the various suppliers and selects the supplier with the highest score.

Alternatively, a consumer also may use performance rating system 100 to rate a single supplier by tracking and analyzing the supplier's performance ratings over a given time period. In such a scenario, performance rating system 100, again, implements a scoring rule that uses information from past transactions involving the supplier to compute several performance ratings for the supplier over a certain period of time (e.g., computing a performance rating for the supplier each quarter over the course of two years). The consumer then compares the different performance ratings to determine whether the supplier's performance has improved over the time period (i.e., whether the supplier's performance rating has increased or shown a trend of increasing over the two years).

The scoring rule implemented by performance rating system 100 is a function of several parameters, each of which is discussed further herein. The parameters relate either directly to supplier performance, to the value the consumer places on the actual level of a supplier's performance or to the importance of the different metrics against which a supplier's performance is evaluated. The consumer can design a customized scoring rule by designating or constructing each of the parameters that make up the scoring rule. Alternatively, the consumer can combine predesigned modules for the different scoring rule parameters to create the scoring rule. Another alternative is that the consumer can use a preexisting scoring rule, designed by another consumer or entity, in performance rating system 100. The consumer also can modify a preexisting scoring rule by altering one or more of the parameters that make up that scoring rule.

In the embodiment shown, performance rating system 100 includes, but is not limited to, scoring rule inputs 108 and a computing device 105, which further includes a scoring engine 122 and a receiving device 136. As shown, scoring rule inputs 108 include a set of performance metrics 110, a set of performance level codes 112, a set of performance levels 114, a set of performance metric point maximums 116, a set of performance level weightings 118 and supplier data 120. Set of performance metrics 110, set of performance level codes 112, set of performance levels 114, set of performance metric point maximums 116 and set of performance level weightings 118 are parameters that the consumer or other entity (referred to as the scoring rule "designer") designates or constructs when designing the scoring rule. Each of scoring rule inputs 108 is discussed below in further detail in conjunction with FIGS. 2-4. Supplier data 120 constitute the inputs to the scoring rule and include any information from past transactions involving the specific supplier being rated. Supplier data 120 generally consists of cost and performance related information, but supplier data 120 also can include any information from past transactions that is of interest to the consumer.

Computing device 105 can be any type of device having a processor, a memory configured to store software and one or more input/output devices. Some examples of computing devices include personal computers, laptop computers, network-based computers and hand-held computing devices.

Scoring engine 122 is configured to use the scoring rule to compute a performance rating for the supplier being rated. As shown, scoring engine 122 includes a raw score generator 124, a performance level generator 126, a scaled score generator 128, a performance rating generator 130, a performance level code repository 132 and a scoring rule repository 134. Each of these elements is discussed below in further detail in conjunction with FIGS. 2-4.

As explained further herein, performance level code repository 132 sets forth the relationships between set of performance level codes 112 and set of performance levels 114, and scoring rule repository 134 sets forth the relationships among set of performance metrics 110, set of performance level codes 112, set of performance levels 114, set of performance metric point maximums 116 and set of performance level weightings 118. The relationships among the parameters set forth in performance level code repository 132 and scoring rule repository 134 define the scoring rule. As also explained further herein, in one embodiment of the invention, the designer creates the scoring rule by designating or constructing the parameters set forth in performance level code repository 132 and scoring rule repository 134. The consumer then uses performance rating system 100 to rate a supplier by entering supplier data 120 into scoring engine 122, which uses the scoring rule to compute a performance rating for that supplier.

Receiving device 136 receives the performance rating from scoring engine 122. Receiving device 136 can be any device capable of receiving the performance rating, including any type of computer monitor or other display device, printer or other printing device or storage medium or other storage device.

Figure 2:
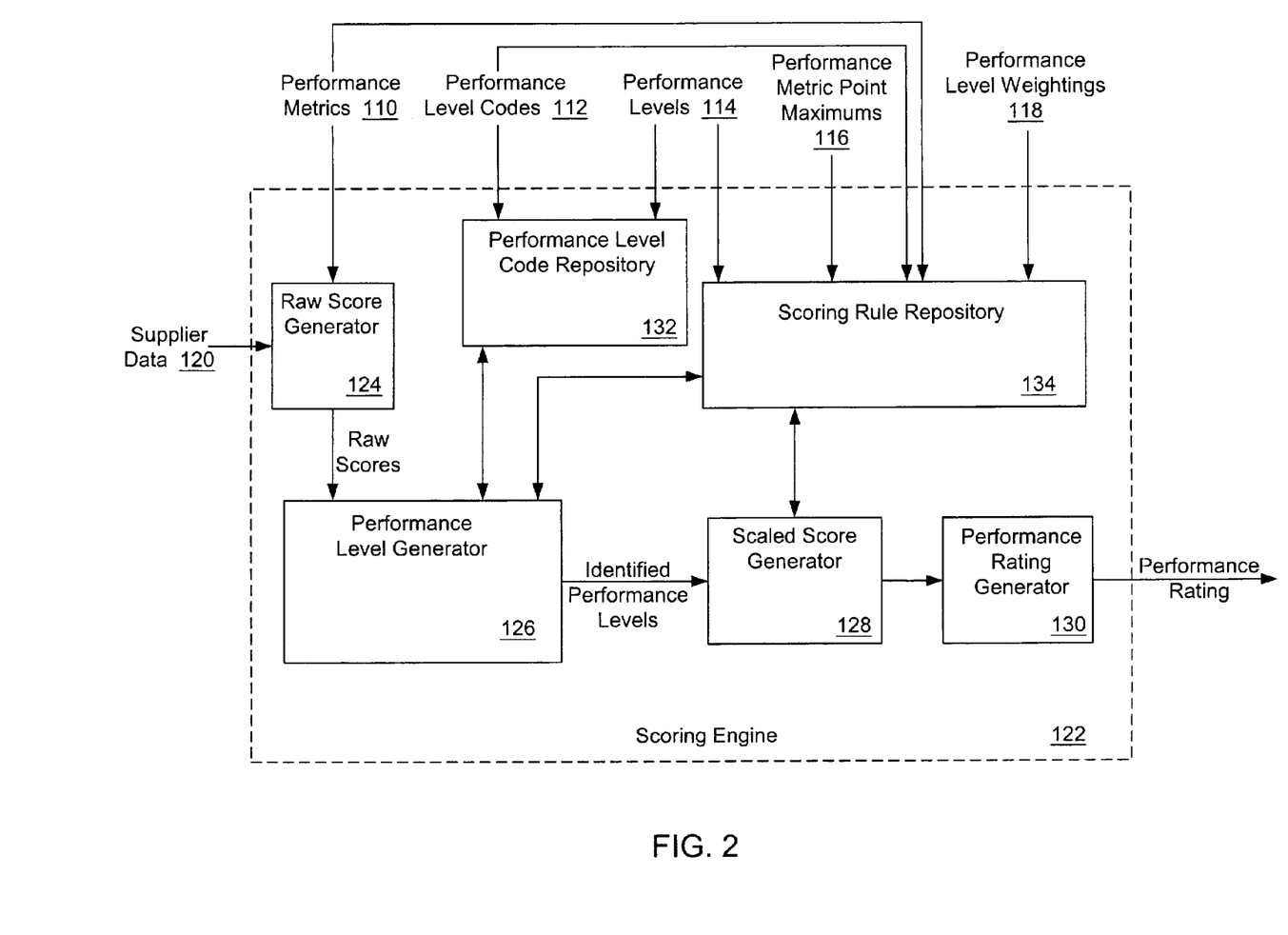
FIG. 2 is a functional block diagram of one embodiment of the scoring engine of FIG. 1, according to the invention.

FIG. 2 is a functional block diagram of one embodiment of scoring engine 122 of FIG. 1, according to the invention. As stated above, the scoring rule is designed by defining set of performance metrics 110, set of performance level codes 112, set of performance levels 114, set of performance metric point maximums 116 and set of performance level weightings 118. As shown, the designer of the scoring rule inputs set of performance level codes 112 and set of performance levels 114 into performance level code repository 132. Further, the designer of the scoring rule inputs set of performance metrics 110, set of performance level codes 112, set of performance levels 114, set of performance metric point maximums 116 and set of performance level weightings 118 into scoring rule repository 134. The consumer also enters into scoring engine 122 supplier data 120 relating to the supplier being rated, and raw score generator 124, performance level generator 126, scaled score generator 128 and performance rating generator 130 perform certain operations to compute a performance rating for that supplier using the parameter relationships set forth in the scoring rule.

Set of performance metrics 110 embodies the criteria that the consumer uses to rate the different suppliers and forms the framework of the scoring rule. The designer of the scoring rule therefore structures set of performance metrics 110 to reflect factors related to supplier performance that are important to the consumer. For example, if a consumer is sensitive to long delivery periods, the designer can designate average time for delivery of receivables as a performance metric. Other examples of performance metrics include average purchase order amount, average response time, whether a supplier is minority owned, credit rating of the supplier and average fills by requisitions sourced, among others.

Raw score generator 124 is configured to receive supplier data 120, to identify each performance metric in the scoring rule (i.e., each performance metric in set of performance metrics 110), to identify data within supplier data 120 related to each performance metric and to generate a raw score for each performance metric using the data related to that performance metric. Raw score generator 124 is further configured to transmit each such raw score to performance level generator 126 for further processing. For example, assume that raw score generator 124 receives supplier data 120 with respect to a particular supplier and identifies "average purchase order cost" as one of the performance metrics in the scoring rule. Raw score generator 124 identifies from supplier data 120 that the costs of all past purchase orders received from that supplier, $5 million, $3 million and $4 million, for example, are the data related to this performance metric. Raw score generator 124 averages this data to generate a raw score of $4 million for this performance metric. Raw score generator 124 transmits this raw score to performance level generator 126 for further processing. As with many of the functions of the invention, the functionality of raw score generator 124 can be implemented in hardware and/or software.

Performance level generator 126 uses the set of performance level codes 112 and set of performance levels 114, obtained from performance level code repository 132, to convert the raw scores generated by raw score generator 124 into unitless values, which allows raw scores with different units and magnitudes to be combined and/or compared within the context of the scoring rule. Performance level code repository 132 sets forth the relationships between set of performance level codes 112 and set of performance levels 114 that the designer has designated in the scoring rule.

Figure 3:
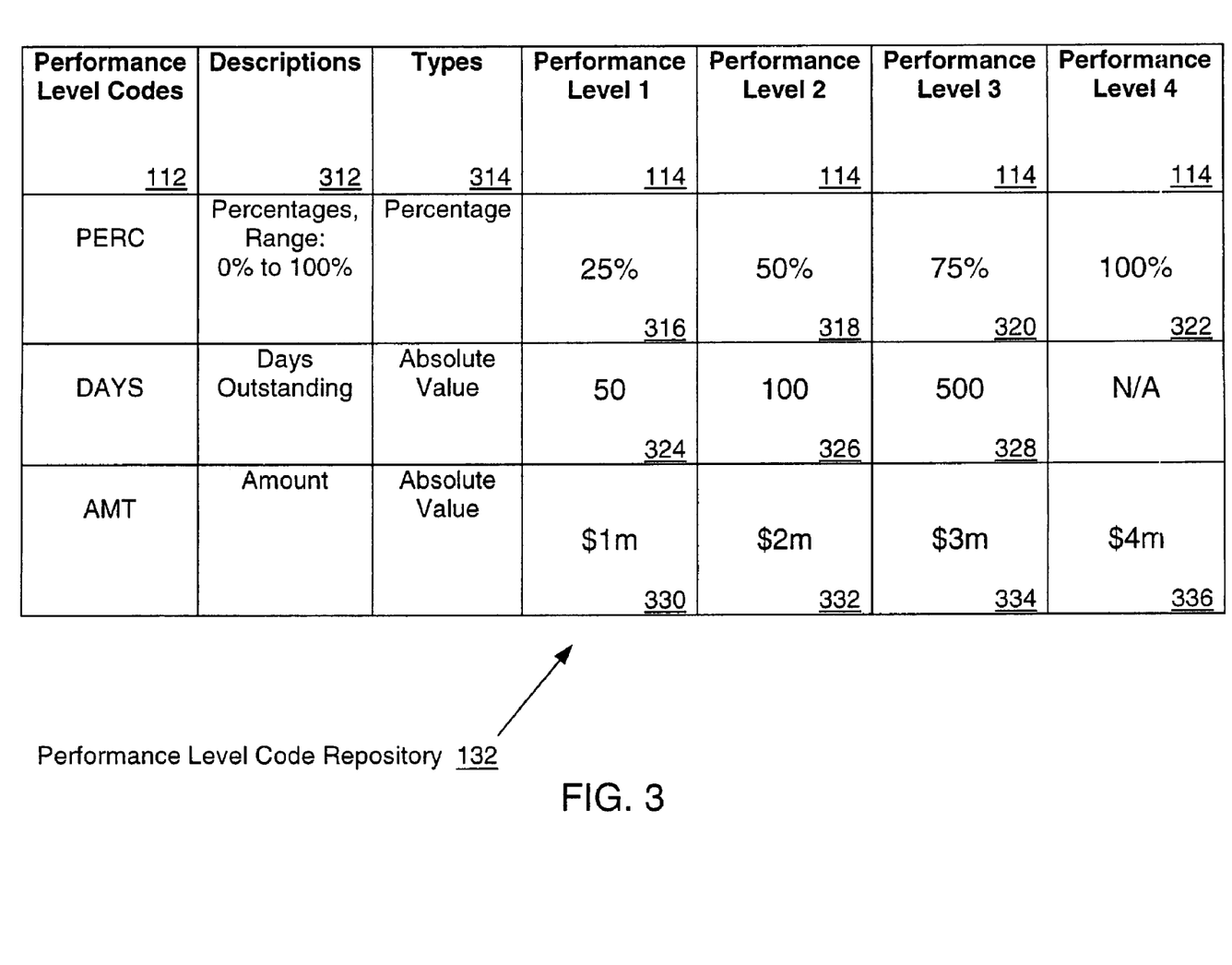
FIG. 3 illustrates one embodiment of the performance level code repository, according to the invention.

FIG. 3 illustrates one embodiment of performance level code repository 132, according to the invention. As shown, performance level code repository 132 includes, in addition to set of performance level codes 112 and set of performance levels 114, descriptions 312 and types 314. Performance level code repository 132 can reside in any type of memory device or storage medium and can be stored in any type of data structure configured to store the elements of performance level code repository 132.

Each of descriptions 312 provides a description of what the raw scores for the performance metrics assigned a specific performance level code represent. For example, the raw scores for any performance metrics assigned the "PERC" performance level code represent values between 0% and 100%, and the raw scores for any performance metrics assigned the "DAYS" performance level code represent numbers of days outstanding.

Each of types 314 sets forth how the raw scores for the performance metrics assigned a specific performance level code are expressed. For example, the raw scores for any performance metrics assigned the "PERC" performance level code are expressed as percentages, and the raw scores for any performance metrics assigned the "DAYS" performance level code are expressed as absolute values.

With respect to set of performance level codes 112, the designer constructs a performance level code for each performance metric in the scoring rule. Each performance level code indicates the description and the type for the raw scores for the performance metrics assigned that performance level code. Each performance level code also conveys the range of possible raw scores for the performance metrics assigned that performance level code. In addition, as discussed further herein, each performance level code conveys the number of performance levels into which that range of possible raw scores is divided as well as the individual raw score range covered by each such performance level. For example, the "PERC" performance level code conveys that 0% to 100% is the range of possible raw scores (as indicated by description 312) for any performance metrics assigned this performance level code and that this range is divided into four performance levels. Further, the "PERC" performance level code conveys that a performance level 316 (performance level 1) covers a raw score range from 0% to 25%, a performance level 318 (performance level 2) covers a raw score range from 26% to 50%, a performance level 320 (performance level 3) covers a raw score range from 51% to 75% and a performance level 322 (performance level 4) covers a raw score range from 76% to 100%.

The raw scores for performance metrics assigned the same performance level code have the same description, type and range of possible values. In addition, the same number of performance levels divides the range of possible raw scores for performance metrics assigned the same performance level code. Further, the individual raw score range covered by each such performance level is the same across performance metrics assigned the same performance level code.

Referring to the previous example, assume that the scoring rule contains a performance metric for which the range of possible raw scores is from 0% to 100%, and the designer wants to divide this range into five performance levels. The designer would not assign the "PERC" performance level code to this performance metric because the "PERC" performance level code conveys that the raw scores of the performance metrics assigned to it are divided into four performance levels, not five. The designer therefore would construct a new performance level code for the performance metric that indicates the same description, type and range of possible raw scores as the "PERC" performance level code, but conveys that the range of possible raw scores is divided into five performance levels instead of four.

Similarly, assume for the same performance metric that the designer wants to divide the range of possible raw scores into four performance levels; but the designer wants the raw score range covered by the first performance level to be from 0% to 20%, the range covered by the second performance level to be from 21% to 40%, the range covered by the third performance level to be from 41% to 60% and the range covered by the fourth performance level to be from 61% to 100%. Again, the designer would not assign the "PERC" performance level code to this performance metric because the designer wants to specify individual raw score ranges covered by the performance levels that are different than those set forth in the "PERC" performance level code (as set forth above). The designer therefore would construct a new performance level code for the performance metric that indicates the same description, type and range of possible raw scores as the "PERC" performance level code, conveys that the range of possible raw scores is divided into four performance levels— similar to the "PERC" performance level code, but also conveys that the individual raw score ranges covered by the performance levels differ from those covered by the performance levels corresponding to the "PERC" performance level code.

With respect to set of performance levels 114, the designer designates a specific number of performance levels for each performance level code in the scoring rule. As explained, the number of performance levels for a given performance level code equals the number of subdivisions into which the designer wants to divide the range of possible raw scores for the performance metrics assigned that performance level code. This allows the designer to designate any number of performance levels for a given performance level code. For example, the designer can designate three performance levels for a given performance level code, or the designer can designate ten.

As also explained, the designer defines the individual raw score range covered by each designated performance level as well. For example, as seen in FIG. 3, performance level 316 (performance level 1) covers raw scores in the range from 0% to 25%, performance level 318 (performance level 2) covers raw scores in the range from 26% to 50%, performance level 320 (performance level 3) covers raw scores in the range from 51% to 75% and performance level 322 (performance level 4) covers raw scores in the range from 76% to 100%. Here, the designer made the size of each individual raw score range covered by each performance level identical. The designer, however, just as easily could have structured these performance levels to make the raw score range covered by performance level 316 be from 0% to 15%, the range covered by performance level 318 be from 16% to 35%, the range covered by performance level 320 be from 36% to 60% and the range covered by performance level 322 be from 61% to 100%.

Referring again to FIG. 2, performance level generator 126 is configured to receive the raw scores generated by raw score generator 124 and to convert each raw score into a performance level. Performance level generator 126 is further configured to transmit each such performance level to scaled score generator 128 for further processing. More specifically, for each raw score, performance level generator 126 identifies the performance metric corresponding to the raw score. Performance level generator 126 uses the relationships between set of performance metrics 110 and set of performance level codes 112 set forth in scoring rule repository 134 to identify the performance level code corresponding to the performance metric. Performance level generator 126 uses the relationships between set of performance level codes 112 and set of performance levels 114 set forth in performance level code repository 132 to identify the raw score ranges covered by the performance levels corresponding to the identified performance level code. Performance level generator 126 matches the raw score with one of these raw score ranges by determining the range within which the raw score falls. Performance level generator 126 identifies the performance level corresponding to this raw score range and transmits this information to scaled score generator 128 for further processing. The functionality of performance level generator 126 can be implemented in hardware and/or software.

For example, assume that the raw score for the "average purchase order amounts" performance metric is $2.5 million. From the relationships set forth in scoring rule repository 134, performance level generator 126 identifies "AMT" as the performance level code selected for the "average purchase order amounts" performance metric. From the relationships defined in performance level code repository 132 (FIG. 3), performance level generator 126 identifies four performance levels corresponding to performance level code "AMT" and determines that performance level 3, which covers the raw score range from $2,000,001 to $3 million, is the performance level within which the raw score of $2.5 million falls. Performance level generator 126 therefore outputs "performance level 3" as the performance level for the "average purchase order amounts" performance metric and transmits this performance level to scaled score generator 128 for further processing.

Scale score generator 128 uses the set of performance metric point maximums 116 and set of performance level weightings 118, obtained from scoring rule repository 134, to convert the performance levels generated by performance level generator 126 into scaled scores. Scoring rule repository 134 sets forth the relationships between the set of performance metric point maximums 116 and set of performance level weightings 118 that the designer has designated in the scoring rule.

Figure 4:
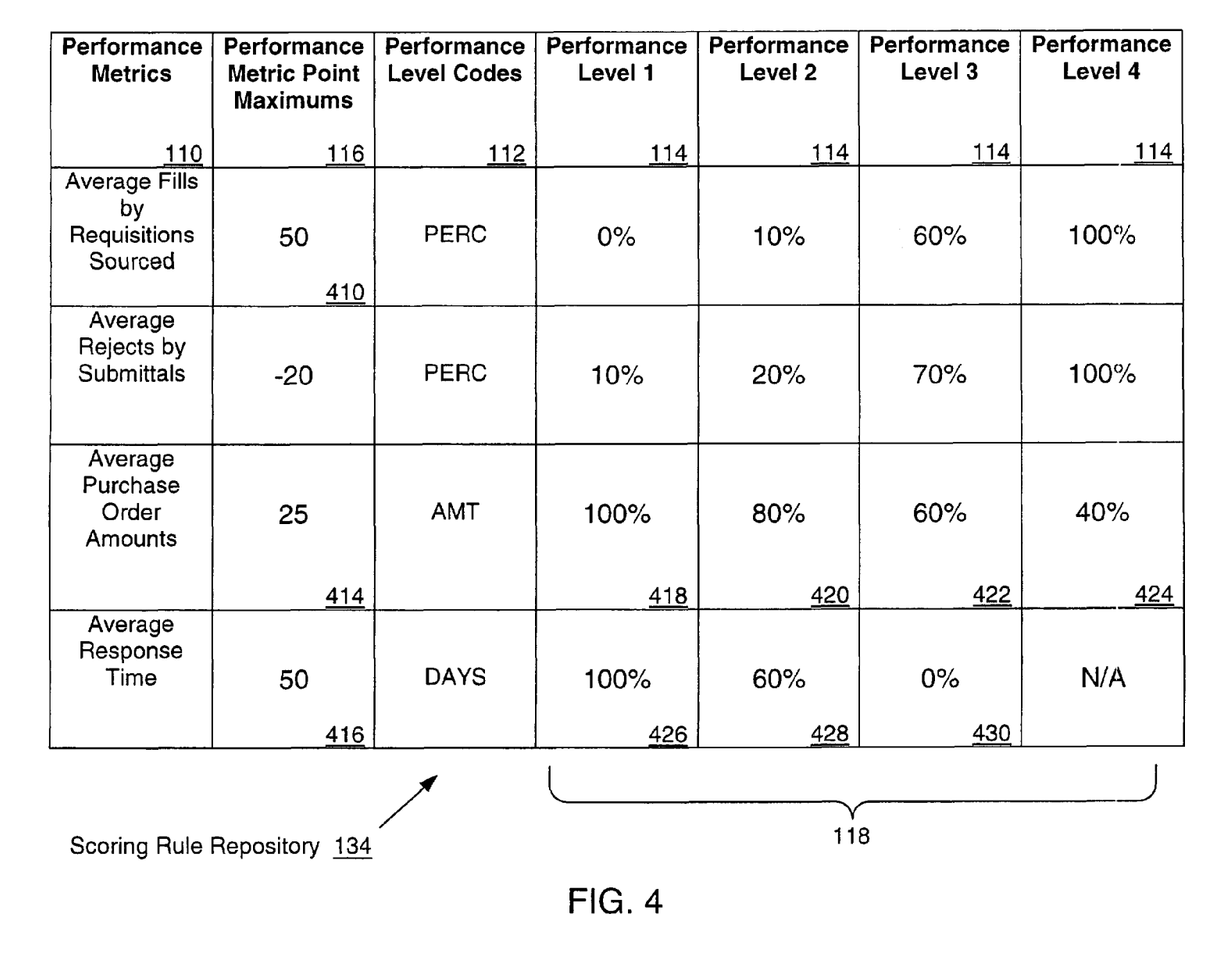
FIG. 4 illustrates one embodiment of the scoring rule repository, according to invention.

FIG. 4 illustrates one embodiment of scoring rule repository 134, according to the invention. As shown, scoring rule repository 134 includes, in addition to set of performance metric point maximums 116 and set of performance level weightings 118, set of performance metrics 110, set of performance level codes 112 and set of performance levels 114. As explained, these parameters provide the framework of the scoring rule. For each performance metric of set of performance metrics 110, scoring rule repository 134 sets forth the performance level code corresponding to that performance metric, the number of performance levels designated for that performance level code, the performance metric point maximum assigned to that performance metric and the performance level weighting assigned to each of the designated performance levels. Scoring rule repository 134 can reside in any type of memory device or storage medium and can be stored in any type of data structure configured to store the elements of scoring rule repository 134.

With respect to set of performance metric point maximums 116, the designer assigns one performance metric point maximum to each performance metric in the scoring rule. Each performance metric point maximum is a unitless value that reflects the importance of the corresponding performance metric to the consumer within the overall context of the scoring rule. A performance metric point maximum can be any positive or negative value. A high-magnitude positive performance metric point maximum indicates that the corresponding performance metric is one that the consumer values greatly (e.g., cost, delivery time, contractor rating, etc.). A low-magnitude positive performance metric point maximum indicates that the corresponding performance metric is one that the consumer values somewhat less. On the other hand, a high-magnitude negative performance metric point maximum indicates that the corresponding performance metric is one that the consumer finds highly objectionable (e.g., number of late deliveries, number of defective products, cost overruns, etc.). A low-magnitude negative performance metric point maximum indicates that the corresponding performance metric is one that the consumer still finds objectionable, but less so.

For example, a performance metric point maximum 410 has a value of 50, a performance metric point maximum 414 has a value of 25 and a performance metric point maximum 416 has a value of 50. The fact that the performance metric point maximums are the same for the "average fills by requisitions sourced" performance metric and the "average response time" performance metric indicates that these two performance metrics have the same importance to the consumer. Similarly, the fact that these two performance metrics have performance metric point maximums that are twice the value of the performance metric point maximum for the "average purchase order" performance metric indicates that the "average fills by requisition sourced" and the "average response time" performance metrics are twice as important to the consumer as the "average purchase order amounts" performance metric.

With respect to set of performance level weightings 118, the designer assigns a performance level weighting to each of the performance levels corresponding to each set of performance metrics 110. For a given performance metric, each corresponding performance level weighting reflects the relative importance to the consumer of raw scores for that performance metric that fall within the raw score range covered by the performance level assigned that particular performance level weighting. More specifically, each performance level weighting corresponding to a given performance metric designates the percentage of the performance metric point maximum assigned to that performance metric awarded for a raw score that falls within the raw score range covered by the performance level assigned that particular performance level weighting.

Based on the foregoing, a high performance level weighting assigned to a specific performance level corresponding to a given performance metric indicates that the consumer greatly values raw scores for that performance metric that fall within the raw score range covered by that performance level. Similarly, a low performance level weighting assigned to a specific performance level corresponding to a given performance metric indicates that the consumer places little value on raw scores for the performance metric that fall within the raw score range covered by that performance level.

For example, for the "average response time" performance metric, a performance level weighting 426 (assigned to performance level 1) has a value of 100%, a performance level weighting 428 (assigned to performance level 2) has a value of 60% and a performance level weighting 430 (assigned to performance level 3) has a value of 0%. The designer assigned these performance level weightings to the performance levels corresponding to the "average response time" performance metric. As discussed, the fact that the designer assigned a high performance level weighting to performance level 1 and a low performance level weighting to performance level 3 indicates that the consumer is very time sensitive. More specifically, performance level weighting 426, which has a value of 100%, shows that the consumer greatly values raw scores for the "average response time" performance metric falling within the raw score range covered by performance level 1 (i.e., an average response time of 0-50 days). By contrast, performance level weighting 430, which has a value of 0%, shows that the consumer places no value on raw scores for the "average response time" performance metric falling within raw score range covered by performance level 3 (i.e., an average response time of over 100 days).

Referring again to FIG. 2, scaled score generator 128 is configured to receive the performance levels generated by performance level generator 126 and to convert each performance level into a scaled score. Scaled score generator 128 is further configured to transmit each such scaled score to performance rating generator 130 for further processing. More specifically, for each received performance level, scaled score generator 128 identifies the performance metric corresponding to the received performance level. Scaled score generator 128 uses the relationships among set of performance metrics 110, set of performance levels 114 and set of performance level weightings 118 set forth in scoring rule repository 134 to identify the performance level weighting assigned to the received performance level. Scaled score generator 128 also uses the relationships between set of performance metrics 110 and set of performance metric point maximums 116 set forth in scoring rule repository 134 to identify the performance metric point maximum assigned to the corresponding performance metric. Scaled score generator 128 multiplies the applicable performance level weighting and the applicable performance metric point maximum to compute a scaled score for the corresponding performance metric. Scaled score generator 128 transmits the scaled score to performance rating generator 130 for further processing. The functionality of scaled score generator 128 can be implemented in hardware and/or software.

For example, assume that scaled score generator 128 receives from performance level generator 126 a performance level for the "average purchase order amounts" performance metric (FIG. 4) equal to performance level 2. From the relationships defined in scoring rule repository 134, scaled score generator 128 identifies 80% as the performance level weighting assigned to performance level 2 for the "average purchase order amounts" performance metric. From the relationships defined in scoring rule repository 134, scaled score generator 132 also identifies 25 as the performance metric point maximum assigned to this performance metric. Scaled score generator 128 multiplies the performance level weighting of 80% and the performance metric point maximum of 25 to generate a scaled score equal to 20. Scaled score generator 128 transmits this scaled score to performance rating generator 130 for further processing.

Performance rating generator 130 is configured to receive the scaled scores generated by scaled score generator 128 and to compute a performance rating for the supplier being rated. Performance rating generator 130 also is configured to transmit the performance rating to receiving device 136. As discussed, for the supplier being rated, scaled score generator 128 produces a scaled score for each performance metric in the scoring rule. Performance rating generator 130 sums these scaled scores to produce a performance rating for the supplier and transmits the performance rating to receiving device 136. The functionality of performance rating generator can be implemented in hardware and/or software.

Figure 5:
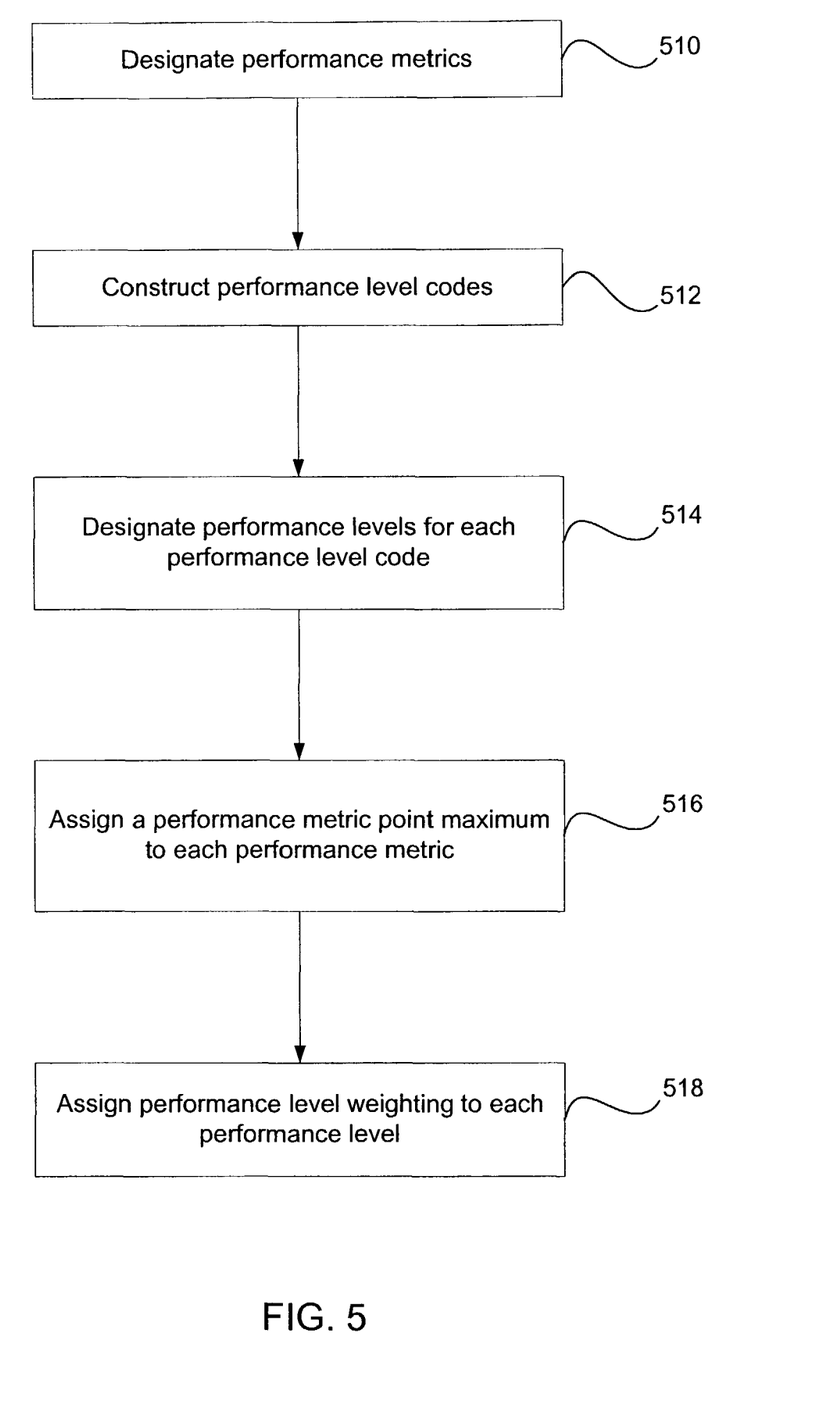
FIG. 5 shows a flowchart of method steps for configuring a scoring rule, according to one embodiment of the invention.

FIG. 5 shows a flowchart of method steps for configuring a scoring rule, according to one embodiment of the invention. Although the method steps are described in the context of the systems illustrated in FIGS. 1-4, any system configured to perform the method steps is within the scope of the invention.

As shown in FIG. 5, in step 510, the designer designates set of performance metrics 110, which forms the basis of the scoring rule. As set of performance metrics 110 embodies the criteria that the consumer uses to rate suppliers, the designer selects set of performance metrics 110 to reflect factors related to supplier performance that are important to the consumer.

In step 512, the designer constructs a performance level code for each of set of performance metrics 110. Each performance level code indicates the description and the type associated with the raw scores for the performance metrics assigned that performance level code. The performance level code also conveys the range of possible raw scores for the performance metrics assigned that performance level code. Further, each performance level code conveys the number of performance levels into which that range of possible raw scores is divided as well as the individual raw score range covered by each such performance level.

In step 514, the designer designates performance levels for each performance level code. The number of performance levels selected for a given performance level code equals the number of subdivisions into which the designer wants to divide the range of possible raw scores for the performance metrics assigned that performance level code. The designer also defines the individual raw score range covered by each performance level.

In step 516, the designer assigns a performance metric point maximum to each performance metric of set of performance metrics 110. Each performance metric point maximum is a unitless value that reflects the importance of the corresponding performance metric to the consumer within the overall context of the scoring rule.

In step 518, the designer assigns a performance level weighting to each of the performance levels corresponding to each of set of performance metrics 110. Each performance level weighting corresponding to a particular performance metric designates the percentage of the performance metric point maximum assigned to that performance metric awarded for a raw score for that performance metric that falls within the raw score range covered by the performance level assigned that performance level weighting.

Figure 6:
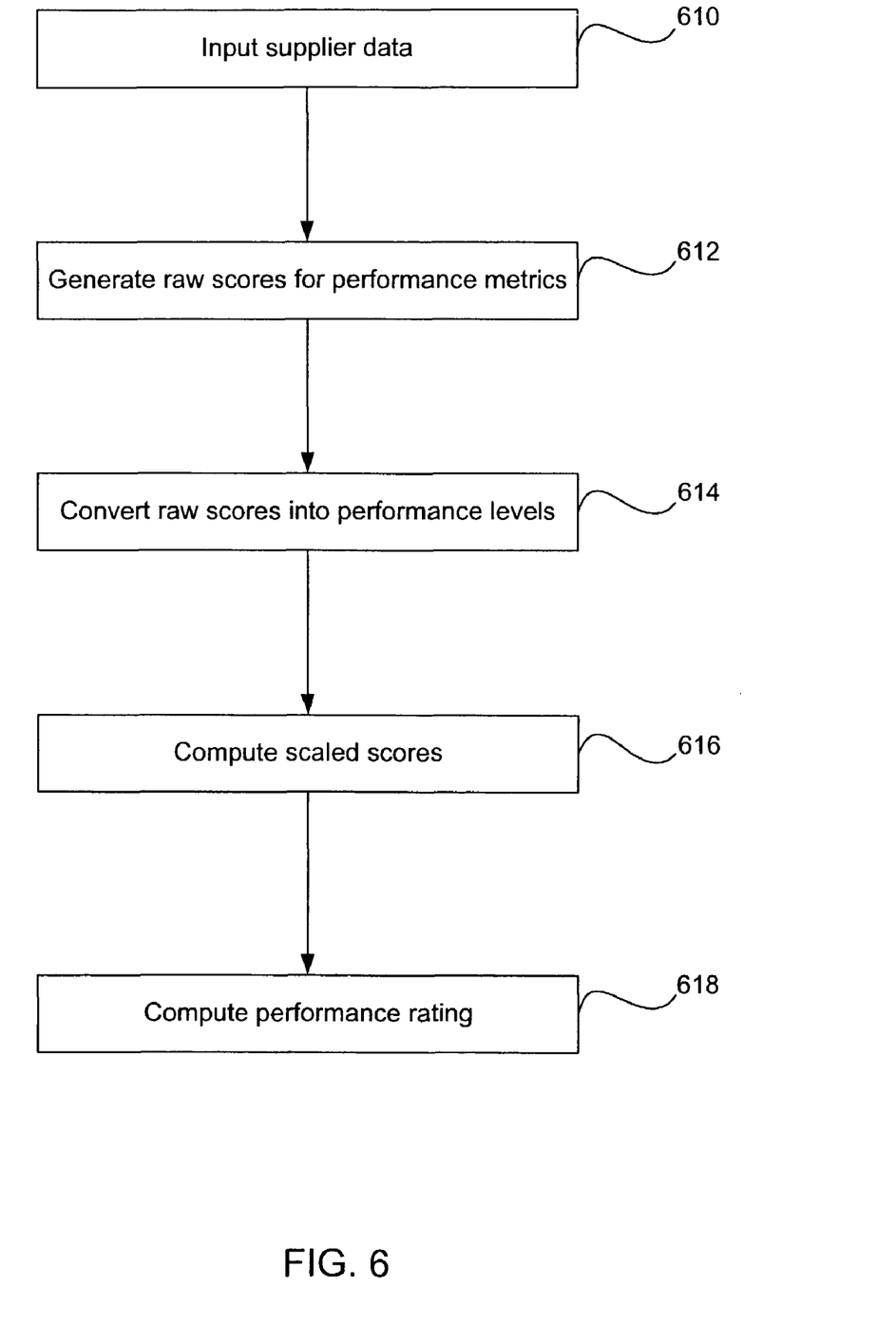
FIG. 6 shows a flowchart of method steps for computing a performance rating, according to one embodiment of the invention.

FIG. 6 shows a flowchart of method steps for computing a performance rating, according to one embodiment of the invention. Although the method steps are described in the context of the systems illustrated in FIGS. 1-4, any system configured to perform the method steps is within the scope of the invention.

As shown in FIG. 6, in step 610, the consumer inputs into scoring engine 122 supplier data 120 for the specific supplier being rated. In step 612, raw score generator 124 generates a raw score for each performance metric of set of performance metrics 110 using the data within supplier data 120 related to that performance metric.

In step 614, performance level generator 126 converts the raw scores into performance levels. For each raw score, performance level generator 126 uses the relationships between set of performance metrics 110 and set of performance level codes 112 set forth in scoring rule repository 134 as well as set of performance level codes 112 and set of performance levels 114 set forth in performance level code repository 132 to identify the performance level in the scoring rule that covers the raw score range within which the raw score falls.

In step 616, scaled score generator 128 converts the performance levels into scaled scores. For each performance level, scaled score generator 128 uses the relationships among set of performance metrics 110, set of performance levels 114, set of performance metric point maximums 116 and set of performance level weightings 118 set forth in scoring rule repository 134 to identify the performance level weighting assigned to the performance level and the performance metric point maximum assigned to the performance metric corresponding to the performance level. Scaled score generator 128 multiplies the performance level weighting and the performance metric point maximum to produce the scaled score.

In step 618, performance rating generator 130 computes a performance rating for the supplier being rated. Performance rating generator 130 sums the scaled scores to produce the performance rating for the supplier.

An advantageous feature of the invention described herein is that the scoring rule is fully configurable, thereby enabling the designer to more flexibly design more powerful scoring rules, uniquely tailored to consumer preferences. First, the designer can designate set of performance metrics 110 to reflect any factors related to supplier performance that are important to the consumer. This flexibility allows the designer to design a scoring rule that better measures the aspects of supplier performance about which the consumer truly cares.

Second, the ability of the designer to incorporate any performance metric of the designer's choosing into the scoring rule allows the consumer to use performance rating system 100 to rate any type of supplier. For example, the designer can designate a set of performance metrics 110 to rate a supplier of information technology services just as easily as the designer can designate a set of performance metrics 110 to rate a supplier of widgets.

Third, the designer can create a different scoring rule simply by selecting a different set of performance metrics 110 to serve as the framework for the scoring rule. For example, if the designer wants to design a scoring rule that rates suppliers with respect to cost, the designer can create a "best cost" scoring rule by selecting only cost-oriented performance metrics to use in that scoring rule. Examples of such performance metrics include average purchase order amount and average response time (a long response or deliver time oftentimes is more expensive for the consumer in terms of opportunity costs). Similarly, if the designer wants to design a scoring rule that rates suppliers with respect to consumer compatibility, the designer can create a "best fit" scoring rule by selecting only compatibility-oriented performance metrics to use in that scoring rule. Examples of such performance metrics include average fills by requisitions sourced, average rejects by submittal and average interviews by submittal. Further, the consumer can rate suppliers using the "best cost" scoring rule, the "best fit" scoring rule or both scoring rules. Performance rating system 100 therefore provides the consumer the ability to rate suppliers on the basis of one scoring rule or multiple scoring rules.

Fourth, the designer can construct as many performance level codes as there are performance metrics in the scoring rule. This capability allows the designer to define a different combination of (i) the range of possible raw scores, (ii) the number of performance levels into which that range is divided and (iii) the individual range of each such performance level for as many of the performance metrics in the scoring rule as the consumer desires.

Fifth, the designer can use performance level weightings in combination with performance levels to design a scoring rule that easily discerns between ranges of raw scores that are valuable to the consumer and those that are not. If the consumer wants to reward suppliers having raw scores for a particular performance metric falling within a specified range, the designer can set up the performance levels corresponding to that performance metric such that the preferred raw score range falls within the raw score range covered by a specific performance level. The designer further can assign a high performance level weighting to that performance level. The consequence is that a supplier having a raw score for the performance metric falling within the preferred range receives a higher scaled score for the performance metric than a supplier having a raw score outside the preferred range.

Similarly, if the consumer wants to punish suppliers having raw scores for a particular performance metric falling within a specific range, the designer can set up the performance levels corresponding to that performance metric such that the undesirable raw score range falls within the raw score range covered by a specific performance level. The designer further can assign a low performance level weighting to that performance level. The consequence is that a supplier having a raw score for the performance metric falling within the undesirable range receives a lower scaled score for that performance metric than a supplier having a raw score outside the undesirable range.

For example, FIG. 3 shows that the "DAYS" performance level code, which the designer selected for the "average response time" performance metric (FIG. 4), has three corresponding performance levels. A performance level 324 (performance level 1) covers a raw score range from 0 to 50 days outstanding, a performance level 326 (performance level 2) covers a raw score range from 51 to 100 days outstanding and a performance level 328 (performance level 3) covers a raw score range from 101 to 500 days outstanding. FIG. 4 shows the performance level weightings assigned to each of these performance levels. Performance level weighting 426 (assigned to performance level 1) has a value of 100%, performance level weighting 428 (assigned to performance level 2) has a value of 60% and performance level weighting 430 (assigned to performance level 3) has a value of 0%.

The combination of these performance levels and performance level weightings indicates that the consumer, with respect to this particular scoring rule, (i) values greatly raw scores for performance metrics assigned the "DAYS" performance level code that fall within performance level 1 (i.e., raw scores in the range of 0 to 50 days outstanding), (ii) places less value on raw scores that fall within performance level 2 (i.e., raw scores in the range of 51 to 100 days outstanding) and (iii) places no value on raw scores that fall within performance level 3 (i.e., raw scores in the range of 101 to 500 days outstanding). The conclusion that follows is that the consumer is time sensitive. The consumer prefers to work with suppliers that have an average response time ranging from 0 to 50 days and prefers not to work with suppliers that have an average response time over 100 days.

In the above example, the consumer draws a hard line, expressing an intolerance of average response times over 100 days. By contrast, the flexibility of both performance levels and their corresponding performance level weightings allows the designer to create a scoring rule that values more proportionally raw scores for performance metrics to which the consumer is less sensitive.

For example, FIG. 3 shows that the "AMT" performance level code, which the designer has constructed for the "average purchase order amounts" performance metric (FIG. 4), has four corresponding performance levels. A performance level 330 (performance level 1) covers the raw score range from $0 to $1 million, a performance level 332 (performance level 2), covers the raw score range from $1,000,001 to $2 million, a performance level 334 (performance level 3) covers the raw score range from $2,000,001 to $3 million and a performance level 336 (performance level 4) covers the raw score range from $3,000,001 to $4 million. FIG. 4 shows the performance level weightings assigned to each of these performance levels. A performance level weighting 418 (assigned to performance level 1) has a value of 100%, a performance level weighting 420 (assigned to performance level 2) has a value of 80%, a performance level weighting 422 (assigned to performance level 3) has a value of 60% and a performance level weighting 424 (assigned to performance level 4) has a value of 40%.

Again, the combination of these performance levels and performance level weightings in this particular scoring rule indicates that the consumer places proportionally less value on average purchase order amounts as those amounts increase. This result is logical as this performance metric represents a cost to the consumer. Further, the weightings show that, although the consumer prefers lower average purchase order amounts, the consumer is not nearly as cost sensitive as the consumer is time sensitive. This conclusion follows from the fact the consumer does not appear to have any point of intolerance (denoted by assigning a markedly lower performance level weighting to a given performance level) with respect to average purchase order amounts, unlike with respect to average response time.

Lastly, the designer can select set of performance metric point maximums 116 to reflect whatever magnitude of importance the consumer wants to place on each performance metric in the scoring rule. Further, the designer can change the value of a given performance metric point maximum independently of the other performance metric point maximums in the scoring rule. This flexibility enables the designer to alter easily the performance metric point maximums within a given scoring rule, while either maintaining or changing the relative magnitudes of the performance metric point maximums. As discussed further herein, this capability facilitates performing "what-if" analyses using the same scoring rule.

The ability to change the values of various performance metric point maximums independently of one another also allows the designer to add (or subtract) performance metrics to (from) the scoring rule without having to change any parameters relating to the other performance metrics in the scoring rule. To add a performance metric, the designer simply has to select a performance level code for the new performance metric, select performance levels for that performance level code, assign a performance metric point maximum to the new performance metric and assign a performance level weighting (discussed below) to each of the selected performance levels. The designer can set each of these new parameters without changing any parameters relating to any of the other performance metrics in the scoring rule. The designer then merely assigns a performance metric point maximum to the new performance metric that properly reflects the importance of that performance metric to the consumer within the overall context of the scoring rule. For example, if the new performance metric is as important to the consumer as an existing performance metric, a performance metric already contained in the scoring rule, the designer would assign a performance metric point maximum to that new performance metric equal to that assigned to the existing performance metric. As discussed further herein, this capability facilitates performing "what-if" analyses using different scoring rules.

Another advantageous feature of the invention described herein is that the consumer can design the scoring rule in numerous ways. First, the consumer can design a completely customized scoring rule by designating the performance metrics, constructing the performance level codes for the performance metrics, designating the performance levels for the performance level codes, assigning the performance metric point maximums to the performance metrics and assigning performance level weightings to the performance levels. Alternatively, the consumer can combine predesigned rule parameters to create the scoring rule. For example, predesigned performance metrics, performance level codes, performance levels, performance metric point maximums and performance level weightings could be provided to the consumer, thereby allowing the consumer to design the scoring rule by selecting the different scoring rule parameters from these predesigned parameters. Another alternative is that the consumer can use a completely predesigned scoring rule (i.e., one that another consumer or entity already has designed) in performance rating system 100. The consumer also can modify a predesigned scoring rule by altering one or more of the parameters that make up the rule.

The invention described herein also has other advantageous features. The consumer can use performance rating system 100 to screen potential suppliers for an upcoming project or transaction. For example, the consumer can design a scoring rule and run hypothetical scoring scenarios to determine a threshold performance rating that a supplier must meet to be considered for an upcoming project or transaction.

The consumer also can use performance rating system 100 as a tool to study and analyze the consumer's business. For example, to design an effective scoring rule, the consumer determines what factors related to supplier performance the consumer values or finds objectionable, the ranges of scores related to those factors that the consumer finds more or less valuable as well as the relative importance of those factors to the consumer. Determining this information allows the consumer to analyze carefully the question of what parameters are and are not important to the consumer's business.

In addition, the consumer can use performance rating system 100 to perform "what-if" analyses with respect to a group of suppliers being rated. One type of "what-if" analysis involves one scoring rule. After generating performance ratings for each supplier being rated, the consumer can alter different parameters in the scoring rule (e.g., performance metric points maximums, performance level weightings and/or the ranges of the various performance levels) to study the effects that those changes have on the performance ratings. Among other things, such an exercise allows the consumer to evaluate how sensitive the scoring rule is to different types of parameter changes. This type of exercise also provides insights as to tradeoffs the consumer may be willing to make with respect to a given performance metric. For example, assume that the consumer decreases the performance metric point maximum for one of the non-cost-related performance metrics in the scoring rule. Assume further that this change causes a different, less expensive supplier to have the highest performance rating. The consumer then can decide whether maintaining the importance assigned to this performance metric within the overall context of the scoring rule is more or less important than the savings the consumer would realize by using the less expensive supplier. Such questions allow the consumer to focus more precisely on the factors related to supplier performance that are truly valuable to the consumer.

Another type of "what-if" analysis involves designing additional scoring rules with which to rate the group of suppliers. For example, assume that the consumer initially rates the group of suppliers using a "best cost" scoring rule. The consumer then can design a "best fit" scoring rule to determine whether a different supplier would have the highest performance rating under the new scoring rule. If so, then the consumer can decide whether "cost" or "fit" is more important. Likewise, instead of designing a completely different scoring rule, a consumer can add a performance metric to an existing performance rule. If a different supplier has the highest performance rating under the new rule, the consumer then can decide whether the extra performance metric is more or less important than the change in supplier ranking. Again, questions such as these allow the consumer to focus more precisely on the factors related to supplier performance that are truly valuable to the consumer.

The invention has been described above with reference to specific embodiments. Persons skilled in the art, however, will understand that various modifications and changes may be made thereto without departing from the broader spirit and scope of the invention as set forth in the appended claims. For example, in one embodiment of the invention, the elements of scoring engine 122 reside on the same computing device such as, for example, a personal computer or a server. Alternatively, one or more elements of scoring engine 122 can reside in one or more separate computing devices. In another embodiment of the invention, performance level code repository 132 and scoring rule repository 134 reside separately in a storage medium or memory device, while the other elements of scoring engine 122 reside in one or more computing devices. In yet another embodiment, performance level code repository 132 and scoring rule repository 134 reside separately in different storage media or memory devices, while the other elements of scoring engine 122 reside in one or more computing devices. The foregoing description and drawings are, accordingly, to be regarded in an illustrative rather than a restrictive sense.

What is claimed is:

1. A method in a computer system for determining a performance rating for a supplier wherein the computer system executes the method as computer program instructions, the method comprising:

receiving a number of performance levels for a performance metric, the number of performance levels designated by a user;

dividing a range of possible raw scores by the user-designated number of performance levels;

receiving a raw score representing a physical quantity generated for at least one performance metric at least in part from information including past transactions involving a specific supplier;

determining a performance level code for each of the at least one performance metric, the performance level code indicating information designated by the user indicating the number of performance levels, a range for each performance level, and the range of possible raw scores for each performance metric;

determining in the computer system the performance level within which the received raw score falls using the performance level code for the at least one performance metric of the received raw score;

identifying the performance level corresponding to the received raw score;

transmitting the performance level corresponding to the received raw score to a scaled score generator;

using a set of performance metric point maximums and a set of performance level weightings by the scaled score generator to obtain from the scoring rule repository to convert the performance levels generated by a performance level generator into scaled scores;

identifying in the computer system a performance level weighting for said performance level;

identifying in the computer system a performance metric point maximum for said performance metric;

multiplying in the computer system said performance level weighting and said performance metric point maximum to produce a scaled score; and summing in the computer system said scale score with at least one other scaled score from at least one other performance metric to produce said performance rating.

2. The method of claim 1, further comprising generating in the computer system said raw score for said performance metric.

3. A computer-readable medium storing instructions for causing a computer to compute a performance rating for a supplier by performing the operations of:

receiving a number of performance levels for a performance metric, the number of performance levels designated by a user;

dividing a range of possible raw scores by the user-designated number of performance levels;

receiving a raw score representing a physical quantity generated for at least one performance metric at least in part from information including past transactions involving a specific supplier;

determining a performance level code for each of the at least one performance metric, the performance level code indicating information designated by the user indicating the number of performance levels, a range for each performance level, and the range of possible raw scores for each performance metric;

determining the performance level within which the received raw score falls using the performance level code for the at least one performance metric of the received raw score;

identifying a performance level weighting for said performance level;

identifying a performance metric point maximum for said performance metric;

identifying the performance level corresponding to the received raw score;

transmitting the performance level corresponding to the received raw score to a scaled score generator;

using a set of performance metric point maximums and a set of performance level weightings by the scaled score generator to obtain from the scoring rule repository to convert the performance levels generated by a performance level generator into scaled scores;

multiplying said performance level weighting and said performance metric point maximum to produce a scaled score; and summing said scale score with at least one other scaled score from at least one other performance metric to produce said performance rating.

4. The computer readable medium of claim 3, further comprising the operation of generating said raw score for said performance metric.

5. A method in a computer system for determining a performance rating for a supplier wherein the computer system executes the method as computer program instructions, the method comprising:

providing in the computer system a plurality of performance level codes, each code corresponding to a performance metric, a performance metric point maximum, and a plurality of performance levels, wherein each performance level corresponds to a performance level output weighting;

receiving a number of performance levels for the performance metric, the number of performance levels designated by a user;

dividing a range of possible raw scores by the user-designated number of performance levels;

identifying the performance level corresponding to the received raw score;

transmitting the performance level corresponding to the received raw score to a scaled score generator;

using a set of performance metric point maximums and a set of performance level weightings by the scaled score generator to obtain from the scoring rule repository to convert the performance levels generated by a performance level generator into scaled scores;

receiving in the computer system a raw score representing a physical quantity generated for at least one performance metric at least in part from information including past transactions involving a specific supplier;

determining in the computer system a performance level code for a performance metric corresponding to the raw score, the performance level code indicating information designated by the user indicating the number of performance levels, a range for each performance level, and the range of possible raw scores for each performance metric;

ascertaining in the computer system the performance level within which the received raw score falls and the corresponding performance level code which covers the raw score;

multiplying in the computer system a performance metric point maximum of the determined performance level code by an output weighting corresponding to the ascertained input value range to produce a scaled score; and summing in the computer system the scaled score with another scaled score from another performance metric to produce the performance rating.

6. The method of claim 5 wherein at least one output weighting of the determined performance level code is different from the other output weightings of the determined performance level code.

7. The method of claim 5 wherein at least one input value range is reconfigurable.

8. A non-transitory computer-readable medium for generating a performance rating for a supplier having sets of instructions stored thereon which, when executed by a computer, cause the computer to:

receive a number of performance levels for a performance metric, the number of performance levels designated by a user;

divide a range of possible raw scores by the user-designated number of performance levels;

receive a raw score representing a physical quantity generated for at least one performance metric at least in part from information including past transactions involving a specific supplier;

determine a performance level code for each of the at least one performance metric, the performance level code indicating information designated by the user indicating the number of performance levels, a range for each performance level, and the range of possible raw scores for each performance metric;

determine the performance level within which the received raw score falls using the performance level code for the at least one performance metric of the received raw score;

identify the performance level corresponding to the received raw score;

transmit the performance level corresponding to the received raw score to a scaled score generator;

use a set of performance metric point maximums and a set of performance level weightings by the scaled score generator to obtain from the scoring rule repository to convert the performance levels generated by a performance level generator into scaled scores;

identify a performance level weighting for said performance level;

identify a performance metric point maximum for said performance metric;

multiple said performance level weighting and said performance metric point maximum to produce a scaled score; and sum said scale score with at least one other scaled score from at least one other performance metric to produce said performance rating.

9. The method of claim 1 further comprising:

receiving a user-designated individual raw score range for each performance level, wherein determining the performance level includes determining the user-designated range within which the received raw score falls to identify the performance level.

10. The computer-readable medium of claim 3 further comprising instructions for causing a computer to perform the operations of:

receiving a user-designated individual raw score range for each performance level, wherein determining the performance level includes determining the user-designated range within which the received raw score falls to identify the performance level.

11. The non-transitory computer-readable medium of claim 8, wherein the sets of instructions when further executed by the computer, cause the computer to:

receive a user-designated individual raw score range for each performance level, wherein determining the performance level includes determining the user-designated range within which the received raw score falls to identify the performance level.

12. The method of claim 1, wherein the performance metric point maximum for said performance metric is a negative value.

* * * * *